Aug. 10, 1926.  1,595,213
A. NEUBAUER
LOCK NUT
Filed Jan. 31, 1925
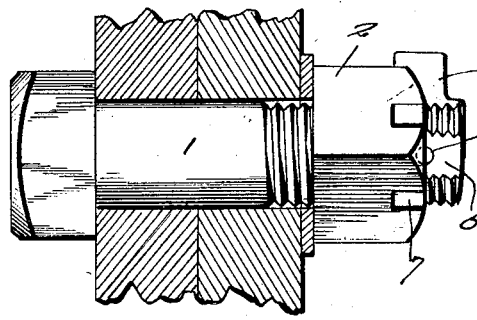
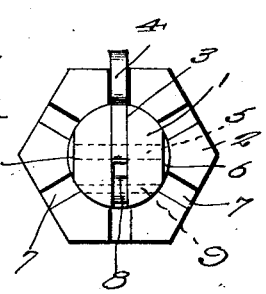
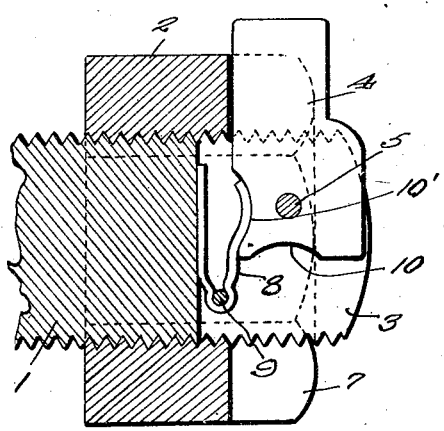
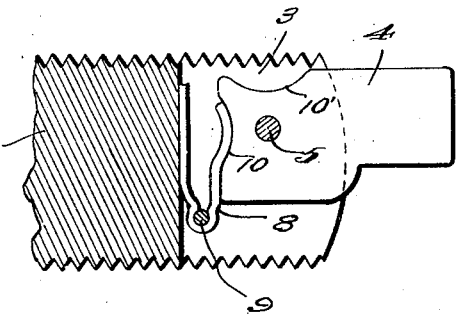
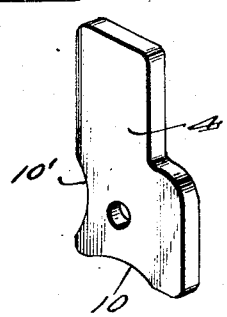
Anton Neubauer INVENTOR Patented Aug. 10, 1926.

1,595,213

UNITED STATES PATENT OFFICE.

ANTON NEUBAUER, OF NORRISTOWN, PENNSYLVANIA.

LOCK NUT.

Application filed January 31, 1925. Serial No. 6,038.

This invention relates to improvements in nut locks, the general object of the invention being to provide a simple and effective lock for holding a nut against turning movement on a bolt.

Another object of the invention is to so form the parts that the locking member will not interfere with the placing of the nut on the bolt, and its removal therefrom, when the locking member is in unlocking position.

A still further object of the invention is to provide spring means for holding the locking member in its locking and unlocking positions.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view, partly in section, showing the invention in use.

Figure 2 is an end view showing a nut locked to a bolt.

Figure 3 is an enlarged sectional detail view showing a nut locked to a bolt.

Figure 4 is a similar view but showing the nut removed and the locking member in inoperative position.

Figure 5 is a perspective view of the locking member.

In these views, 1 indicates a bolt and 2 a nut, and in carrying out my invention I form a slot 3 in the threaded end of the bolt and pivot in said slot a locking lever 4 by means of the pin 5 which is passed through holes formed in the slotted end of the bolt and in the lever. A portion of the bolt is flattened, as at 6 to receive the pin and to prevent the end of the pin from interfering with the nut. This lever is so arranged that when in vertical position it will not interfere with the placing of a nut on the bolt, and then, when the nut has been screwed home, the lever can be swung to a horizontal position so that it will engage any one of a number of notches 7 formed in the nut and thus the nut will be locked to the bolt by the lever. The lever is held in either its vertical or horizontal position by means of a hairpin-shaped spring 8, secured in the bottom of the slot 3, by a pin 9, and which has one limb thereof adapted to engage the recesses 10 and 10', one of which is formed in the bottom edge of the lever and the other in the outer side edge thereof. Thus, when the lever is in vertical position, the spring will engage the recess 10 and hold the lever in this position and when the lever is in horizontal or locking position the spring will engage the recess 10' and hold the lever in this position.

From the foregoing it will be seen that I have provided a simple and effective device for locking a nut to a bolt, the device not interfering with the placing of the nut on the bolt or its removal therefrom. The locking lever can be easily and quickly moved from its unlocking position to its locking position and vice versa, and the spring will act to prevent it from being accidentally moved from one position to another.

When the device is used in places where the parts are exposed to the elements, such as on railroads and the like, the parts should be formed of non-rusting material so that there will be no danger of the lever rusting to the bolt and nut and thus prevented from being moved to unlocking position. A sufficient part of the lever will project beyond the nut to enable the lever to be moved to unlocking position by being grasped by the fingers or engaged by a tool. By forming the nut with a plurality of notches 7 the nut can be screwed home upon the work piece or a washer, as shown in Figure 1, and then the lever swung into engagement with one of the notches to prevent turning movement of the nut.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a bolt, and its nut, the bolt having a slot in its threaded end, a flattened portion on opposite sides of the bolt at right angles to the slot, said nut having a plurality of notches therein, a locking lever having one end disposed within the slot in the bolt, a pin extending through the bolt and lever with its ends terminating at the flattened portions, the inner end and one side edge of said locking lever being formed with arcuate recesses and a hair pin shaped spring having one of its leg portions bearing against one of the inner ends of the slot in the bolt and the other end formed with an arcuate portion for engagement with either one of the recesses in the locking lever.

In testimony whereof I affix my signature.

ANTON NEUBAUER.